United States Patent [19]

Tate et al.

[11] Patent Number: 5,463,769
[45] Date of Patent: Oct. 31, 1995

[54] METHOD AND APPARATUS USING DICTIONARY OF METHODS AND STATES FOR HIGH PERFORMANCE CONTEXT SWITCHING BETWEEN BUILD AND RUN MODES IN A COMPUTER APPLICATION BUILDER PROGRAM

[75] Inventors: Bruce A. Tate; Alex C. Chow; Stephen B. Gest, all of Travis County, Tex.

[73] Assignee: International Business Machines Corporation, Armonk, N.Y.

[21] Appl. No.: 168,104

[22] Filed: Dec. 15, 1993

[51] Int. Cl.⁶ ............................. G06F 15/02; G06F 9/06
[52] U.S. Cl. ..................... 395/700; 395/650; 395/159; 395/600; 364/DIG. 1; 364/286.3; 364/282.1; 364/246
[58] Field of Search ........................... 395/600, 650, 395/159, 425; 364/DIG. 1

[56] References Cited

U.S. PATENT DOCUMENTS

| | | | |
|---|---|---|---|
| 4,739,477 | 4/1988 | Barker et al. | 364/300 |
| 4,833,597 | 5/1989 | Wakayama et al. | 364/200 |
| 4,979,109 | 12/1990 | Tanaka et al. | 364/200 |
| 4,989,132 | 1/1991 | Mellender et al. | 364/200 |
| 5,043,869 | 8/1991 | Suzuki et al. | 364/200 |
| 5,075,842 | 12/1991 | Lai | 395/425 |
| 5,127,098 | 6/1992 | Rosenthal et al. | 395/650 |
| 5,146,591 | 9/1992 | Bachman et al. | 395/600 |
| 5,161,223 | 11/1992 | Abraham | 395/600 |
| 5,161,225 | 11/1992 | Abraham et al. | 395/600 |
| 5,168,441 | 12/1992 | Onarheim et al. | 364/146 |
| 5,206,950 | 1/1993 | Geary et al. | 395/600 |
| 5,361,350 | 11/1994 | Conner et al. | 395/600 |
| 5,408,659 | 4/1995 | Cavendish et al. | 395/650 |

*Primary Examiner*—Thomas G. Black
*Assistant Examiner*—Jean R. Homere
*Attorney, Agent, or Firm*—Whitham, Curtis, Whitham & McGinn; Mark Walker

[57] ABSTRACT

A system and method for changing the methods of an object based on the mode of the application. Two types of dictionaries are used, a first type which defines all of the methods for an object for a particular mode and a second type which defines all of the modes supported by an application. In addition, a variable can be used to store the dictionary of methods for the current mode. This invention uses object oriented programming techniques.

8 Claims, 2 Drawing Sheets

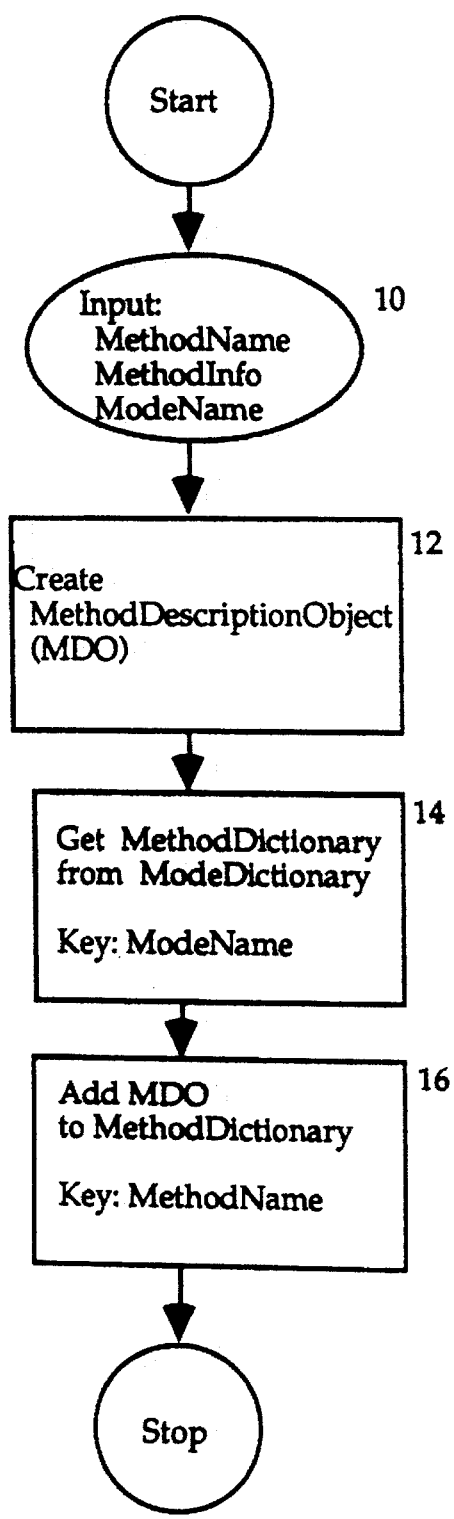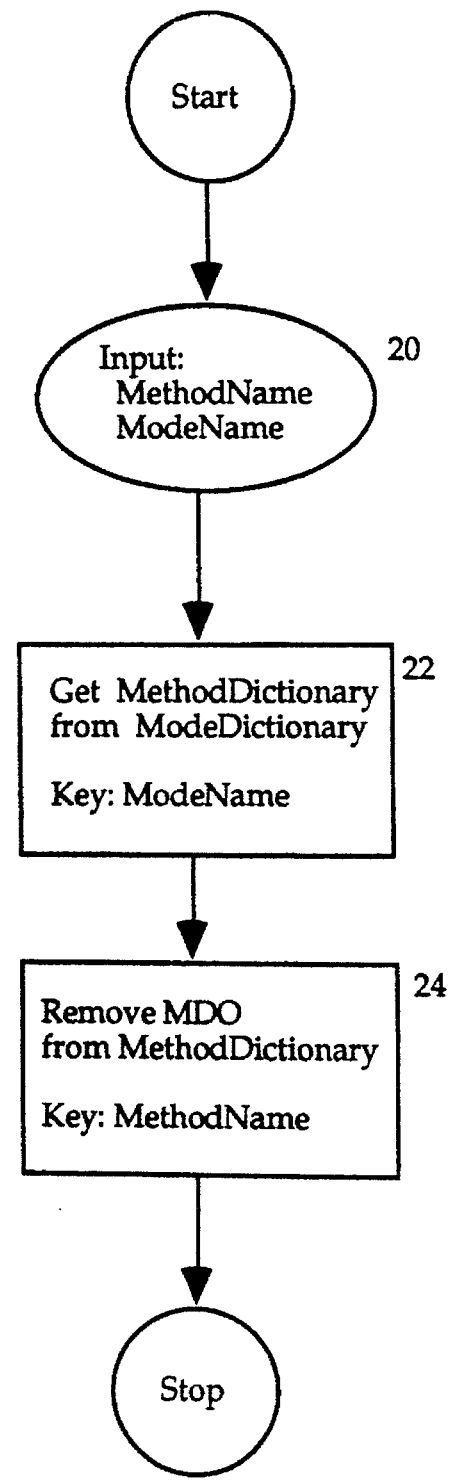
FIGURE 1
FIGURE 2

METHOD AND APPARATUS USING DICTIONARY OF METHODS AND STATES FOR HIGH PERFORMANCE CONTEXT SWITCHING BETWEEN BUILD AND RUN MODES IN A COMPUTER APPLICATION BUILDER PROGRAM

BACKGROUND OF THE INVENTION

1. Field of the Invention

The present invention generally relates to the art of object oriented programming in the field of computer science and, more particularly, to a technique for high performance context switching which facilitates the development of programs using an application builder by easily switching methods when there is a change in the mode of an application, for example a change between run and build modes.

2. Description of the Prior Art

The use of object oriented programming (OOP) techniques has become increasingly popular in recent years. OOP is the preferred environment for building user-friendly, intelligent computer software. Key elements of OOP are data encapsulation, inheritance and polymorphism. Object classes are used for the encapsulation of information and behavior. The object classes can be used to create other similar objects. Then, these object classes can be customized for a particular application. Object data is stored in attributes and object behaviors are called methods.

The advantages of OOP include the ability to share and reuse code due to the use of specialization and encapsulation. This, in turn, increases the productivity of the programmers. In addition, object oriented techniques are particularly useful for generating graphical user interfaces (GUI) which are more intuitive. These interfaces use icons, including folders, documents, printers, and trash cans, to represent objects and use a windowing environment utilizing mouse cursors and menus.

Further information on the subject of object oriented programming may be had by reference to *Object Oriented Design with Applications* by Grady Booch, The Benjamin/Cummings Publishing Co., Inc., Redwood City, Calif. (1991), and *An Introduction to Object-Oriented Programming* by Timothy Budd, Addison-Wesley Publishing Co. (1991).

The simplicity of OOP has created a new environment which is available for programmers called visual programming. In this area, programming is accomplished by dragging and dropping desired objects. Lines are drawn from source objects to target objects to signify a connection between the objects. A connection is a method invocation which is usually triggered by a static event, for example a press of a button or an abstract event, such as the change of an object's color attribute value.

The design of an object oriented visual programming environment requires the definition of methods which are supported by an object. However, the behavior of an object may vary depending on whether it is invoked during the building of the application and within a completed application. Hereinafter, the behavior within a completed application is referred to as "run mode" behavior, and the behavior when the application is being built is referred to as "build mode" behavior. Although, the following examples use build and run mode, it is possible for there to be other modes. For example, in building an application builder using an application builder, there would be build and run modes for both the builder and the application.

Two examples of visual objects are a check box, which is a box on the screen that may or may not have a check in it, and a spin button, which has a value region and an up arrow and a down arrow. In run mode, the check box allows the user to place the mouse cursor within the box and press a mouse button (this operation is called a click) to change its state from checked to unchecked or from unchecked to checked. The check box object may have a method, "ToggleState", that is called whenever the user clicks on the check box.

The value region of the spin button contains one of a list of elements. In run mode, Clicking the cursor on the down arrow changes the value region to the next element in the list. Clicking the cursor on the up arrow changes the value to the previous element in the list. Therefore, a spin button may have methods called "SpinUp" and "SpinDown" that are invoked respectively when the user clicks on the up or down arrow in the spin button.

As illustrated in the above examples, during the build mode, the method is invoked to allow the user to accomplish a desired action. However, in build mode, the programmer needs information about the attributes of the object, for example the location, size, shape, and color of the object. Therefore, during build mode, the methods which need to be invoked are Resize, Move, SetColor, and the like. It is therefore desired that the behavior of the object can vary with the mode of the application.

In the past, switching between modes required the use of complex logic within each method or the implementation of different objects for each state or multiple instance variables. These solutions have resulted in complex code logic, which results in a degradation in performance during the design of programs using a visual program builder and results in programs which are difficult to understand and maintain.

SUMMARY OF THE INVENTION

It is therefore an object of the present invention to provide a method which simplifies the switching between modes, for example a run mode and a build mode.

It is another object of the present invention to provide a method for context switching which is implemented in an object oriented visual program builder.

It is a further object of the present invention to provide a simplified method for invoking different methods depending on the mode of the program.

It is also an object of the present invention to provide the above methods in an intuitive manner.

According to the invention, all of the methods for an object class for any given mode are placed within a method dictionary. In addition, each object class will have a mode dictionary, which contains all of the method dictionaries for the class. A dictionary, as used in this application, refers to a data structure which uses labels or keys to identify an object. The label used in the method dictionary is the method name, and the object is a pointer to the method code or some object which implements the method. In the mode dictionary, the label is the name of the mode, and the object is a dictionary of methods. The invention is based on a design which is a dictionary of dictionaries. The outside dictionary is for modes, while the inside dictionary is for methods. The default mode can be stored in an instance variable or global variable containing the dictionary of methods for the current mode. The use of the method of the present invention allows the mode to be switched simply by reading a single dictionary entry from the mode dictionary and placing the value in the instance variable.

BRIEF DESCRIPTION OF THE DRAWINGS

The foregoing and other objects, aspects and advantages will be better understood from the following derailed description of a preferred embodiment of the invention with reference to the drawings, in which:

FIG. 1 is a flow diagram showing the logic of the process for adding a method to an object class;

FIG. 2 is a flow diagram showing the logic of the process for deleting a method from an object class;

DETAILED DESCRIPTION OF A PREFERRED EMBODIMENT OF THE INVENTION

Figure 3:
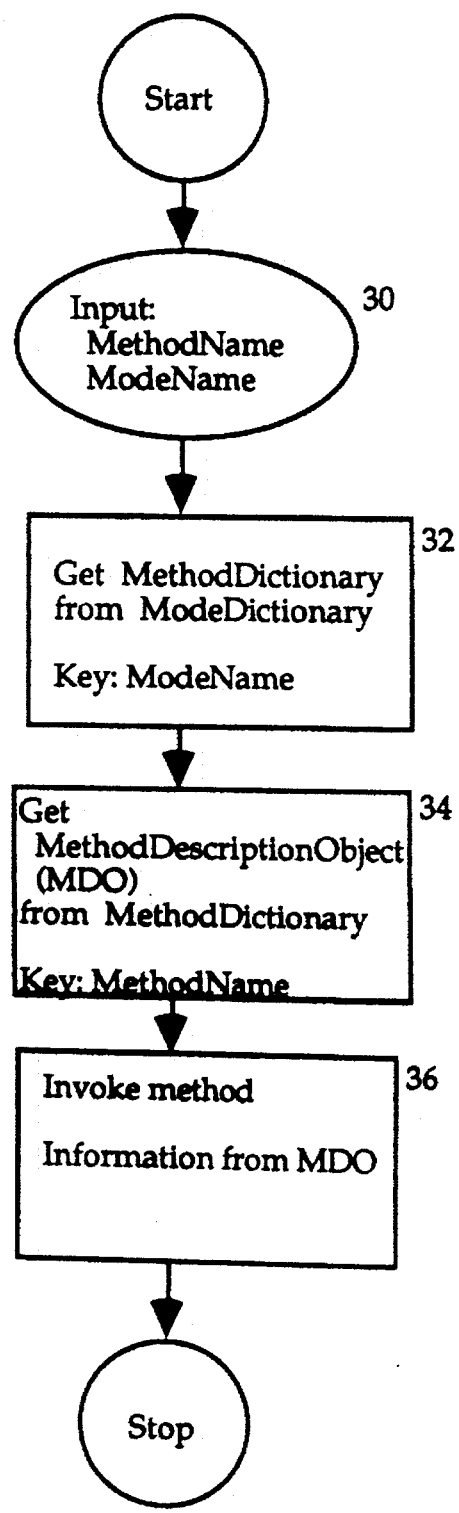
FIG. 3 is a flow diagram showing the logic of the process for invoking a method.

Dictionaries are data structures which can be used to store and retrieve objects efficiently. Each object in the dictionary has an associated label, or key. For example, to store a person object into a dictionary, one might say store(MyDictionary, "123-45-6789", JohnDoeObject).

MyDictionary is the dictionary object that is being used. The key or label to the dictionary is the social security number or in this case 123-45-6789. JohnDoeObject is the object which contains the person information that is to be stored in the dictionary. At this point, there is no need to recall any information about JohnDoeObject. In order to retrieve the object, the social security number must be provided, as shown below personObject=get(MyDictionary, "123-45-6789").

This statement places the information contained in JohnDoeObject into personObject and makes it available for use.

In the present invention, two types of dictionaries are used to store information regarding the methods and modes available to a particular object class. The first type of dictionary contains information about the methods. Each method is represented by an object. The following is an example of a class definition which could be used for the methods.

Class: MethodDescription
Attributes:
  MethodName
  MethodAddress
  ModeName
  (additional information)
Methods:
  InvokeMethod Each entry in the method dictionary at least contains a label, which could be the name of the method or some other unique identifier and the method description object for that particular method. In the example provided above, the method description object includes the method name, the address for the implementation of the method and any additional information necessary to invoke the method, for example types of parameters. It is expected that other definitions of the method class could be used and that the method description object could vary depending on the requirements of the particular implementation. There can be one or more method dictionaries and it is preferred that one method dictionary is created for each mode supported by the application. An example of method dictionaries is provided below, using the spin button example, discussed supra.

| MethodName | MethodDescriptionObject |
|---|---|
| BuildMethodDictionary (for build mode) | |
| Resize | ResizeMethodDescription |
| Move | MoveMethodDescription |
| SetColor | SetColorMethodDescription |
| RunMethodDictionary (for run mode) | |
| SpinUp | SpinUpMethodDescription |
| SpinDown | SpinDownMethodDescription |

The second type of dictionary is used to store information regarding each of the modes supported by the application. This dictionary uses the name of the mode, in the above example, build and run, as the label and the relevant method dictionary of the mode as the object. As noted above, other fields can be used as the label and the object and additional modes can be present in the application. The following is an example of the mode dictionary for the above example.

| ModeName | ModeDictionaryObject |
|---|---|
| Run | RunMethodDictionary |
| Build | BuildMethodDictionary |

A single mode dictionary exists for an entire object class, in this case the spin button class. All of the objects which belong to this class can use the dictionary. The mode name included as an attribute in the method dictionary, supra, is the key to the mode dictionary and provides access to the information regarding the methods which are supported.

The method described, supra, requires that two different dictionaries be read each time a method is invoked, one time for the mode and one time for the method. However, in the preferred embodiment, an instance or a global variable which points to the method dictionary corresponding to each mode can be added. The instance variable is set to the appropriate method dictionary each time the mode is changed. The addition of this variable provides a means whereby only a single dictionary access is necessary each time a method is invoked.

In an object oriented environment, it is necessary to be able to add methods to and delete methods from an object class and to invoke methods. The design of the data structure described above makes these operations straight forward. In addition, this system provides information about the methods, including a list of the supported methods. This information can be obtained from the appropriate method dictionary. The use of the mode dictionaries requires that the system must allow a mode to be added, deleted or changed. All of these functions will be described in more detail below.

Referring now to the drawings, and more particularly to FIG. 1, there is shown a flow diagram for the procedure of adding a method using the system of the present invention. As shown, it is necessary to input the relevant method information 10, for example the MethodName, other method information and the ModeName. This information is used to create a MethodDescriptionObject (MDO) 12. As discussed previously, the MDO is an object which contains information about the method. Since the application can support multiple modes, the ModeName is used to retrieve the correct MethodDictionary 14. The MDO containing the information about the new method is then added to the MethodDictionary using the MethodName as the key 16. This system ensures that the new method is associated with the corresponding mode.

The deletion of a method from an object class is shown in FIG. 2. In order to identify the desired method for deletion, it is necessary to obtain the keys for both dictionaries 20, in this case the MethodName and the ModeName. The ModeName is used to obtain the correct MethodDictionary 22. Finally, the MethodName is used to find and delete the desired method from the MethodDictionary 24.

An example of the logic used in the present invention to invoke a method is shown in FIG. 3. As shown, the MethodName and ModeName for the desired method are obtained 30. Then, the MethodDictionary is retrieved using the ModeName as the key 32. It is also possible to use the object's instance variable to obtain the method dictionary. At this point, the desired MethodDescriptionObject is obtained from the MethodDictionary 34. The information in the MDO is used to invoke the desired method 36.

The addition and deletion of modes from the mode dictionary utilize the standard logic for the addition or deletion of an entry from a dictionary or data structure.

Figure 4:
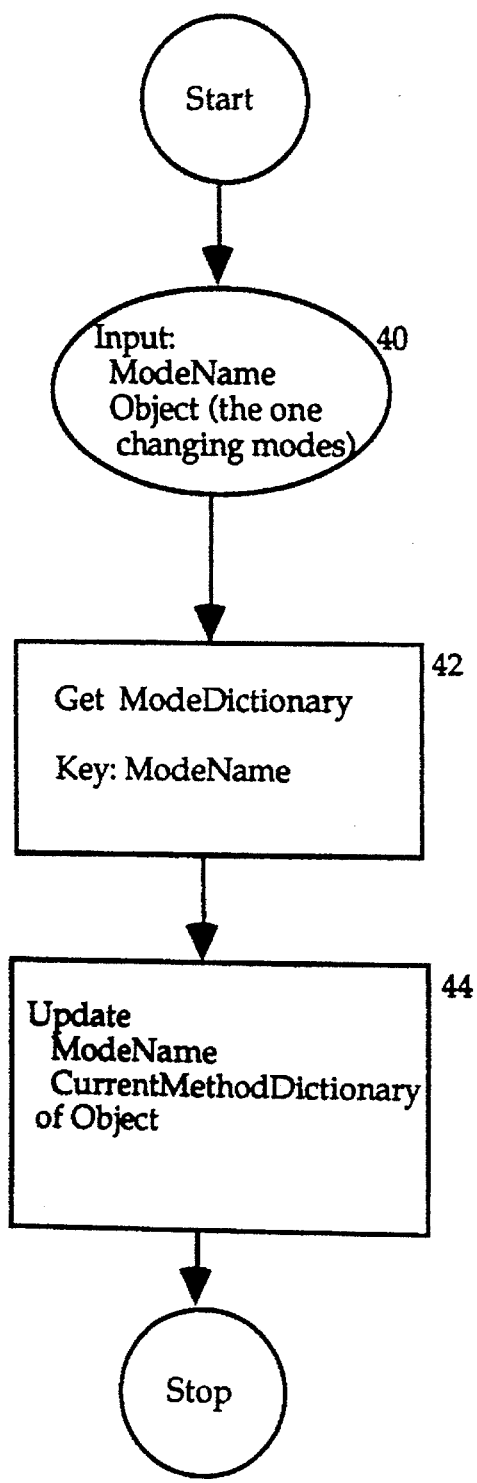
FIG. 4 is a flow diagram showing the logic of the process for changing modes.

An illustrative flow diagram of the logic for changing modes is shown in FIG. 4. First, the ModeName of the mode to be changed to and the Object for which the mode is to be changed are obtained 40. The ModeName is used to obtain the ModeDictionary for the new mode 42. Finally, the information in the Object is updated to reflect the new ModeName 44. In addition, as described in the preferred embodiment, if an instance or global variable (in the figure, CurrentMethodDictionary) is being used, it is necessary to update this variable with the new dictionary of methods for the new mode 44.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An object oriented method for mode switching between build and run modes in a computer application builder program, comprising the steps of:

providing a plurality of dictionaries as dam structures which use keys to identify objects which implement methods, wherein at least first and second ones of said dictionaries define one or more methods for a first and a second mode and a third one of said dictionaries is a mode dictionary which defines build and run modes for an application program being programmed using the computer application builder program;

identifying one or more keys for each of said dictionaries; and switching between build and run modes of the application program being programmed using the computer application builder program by using said one or more keys for said mode dictionary to retrieve a method dictionary for a corresponding mode.

2. An object oriented method for mode switching, as recited in claim 1, further comprising the step of providing a variable in which said key for one of said method dictionaries is maintained.

3. A method for context switching between modes, as recited in claim 2, wherein said step of switching further includes updating said variable with said key of said method dictionary, said key corresponding to the current mode.

4. A method for context switching between modes, as recited in claim 1, further comprising the step of invoking a method of the dictionary obtained for a new mode.

5. An apparatus for context switching between build and run modes in a computer application builder, comprising:

a plurality of dictionaries in computer storage as data structures which use keys to identify objects which implement methods, wherein at least first and second ones of said dictionaries define one or more methods for a first and second mode and a third one of said dictionaries is a mode dictionary which defines build and run modes for an application program being programmed by said computer application builder and each of said dictionaries include one or more keys for each of said dictionaries; and switching means for context switching between build and run modes of the application program being programmed on the computer application builder, said switching means reading said one or more keys for said mode dictionary to retrieve a method dictionary for a corresponding mode.

6. An apparatus for context switching, as recited in claim 5, further comprising means for invoking a method of the dictionary obtained for the current mode.

7. An apparatus for context switching, as recited in claim 5, further comprising a variable in computer storage in which said key for one of said method dictionaries is maintained.

8. An apparatus for context switching, as recited in claim 7, wherein said switching means further includes means for updating said variable with said key for one of said method dictionaries, said key corresponding to the current mode.

* * * * *

UNITED STATES PATENT AND TRADEMARK OFFICE
CERTIFICATE OF CORRECTION

PATENT NO. : 5,463,769
DATED : October 31, 1995
INVENTOR(S) : Bruce A. Tate, Alex C. Chow and Stephen B. Jest It is certified that error appears in the above-indentified patent and that said Letters Patent is hereby corrected as shown below:

Col. 5, line 44, delete "dam" and insert --data--;

Signed and Sealed this

Thirteenth Day of August, 1996

*Attest:*

BRUCE LEHMAN

*Attesting Officer*          Commissioner of Patents and Trademarks